(12) United States Patent
Doss et al.

(10) Patent No.: US 9,737,899 B2
(45) Date of Patent: Aug. 22, 2017

(54) WATER CONTROL SYSTEM HAVING A TEMPERATURE CONTROLLED TUB FAUCET VALVE

(71) Applicant: Evolve Technologies, LLC, Scottsdale, AZ (US)

(72) Inventors: Jeff Doss, Scottsdale, AZ (US); Jason Swanson, Tempe, AZ (US)

(73) Assignee: Evolve Technologies, LLC, Scottsdale, AZ (US)

( * ) Notice: Subject to any disclaimer, the term of this patent is extended or adjusted under 35 U.S.C. 154(b) by 392 days.

(21) Appl. No.: 14/511,007

(22) Filed: Oct. 9, 2014

(65) Prior Publication Data

US 2015/0096116 A1 Apr. 9, 2015

Related U.S. Application Data

(60) Provisional application No. 61/888,865, filed on Oct. 9, 2013.

(51) Int. Cl.
| | |
|---|---|
| *A47K 13/20* | (2006.01) |
| *B05B 1/18* | (2006.01) |
| *E03C 1/04* | (2006.01) |
| *E03C 1/02* | (2006.01) |
| *F16K 31/00* | (2006.01) |
| *F16K 31/524* | (2006.01) |

(52) U.S. Cl.
CPC ............. *B05B 1/18* (2013.01); *E03C 1/023* (2013.01); *E03C 1/0408* (2013.01); *F16K 31/002* (2013.01); *F16K 31/52475* (2013.01)

(58) Field of Classification Search
CPC ......... B05B 1/18; E03C 1/023; E03C 1/0408; F16K 31/002; F16K 31/52475
USPC ............................................................. 4/570
See application file for complete search history.

(56) References Cited

U.S. PATENT DOCUMENTS

| | | | |
|---|---|---|---|
| 7,407,113 | B2 | 8/2008 | Guterman |
| 7,681,804 | B2 | 3/2010 | Lockhart |
| 8,360,335 | B2 | 1/2013 | Gross |
| 8,464,962 | B2 | 6/2013 | Lockhart |
| 2006/0157575 | A1 | 7/2006 | Lockhart |
| 2007/0075152 | A1 | 4/2007 | Guterman |
| 2007/0119989 | A1* | 5/2007 | Nagano ................... E03C 1/023 239/526 |

(Continued)

OTHER PUBLICATIONS

International Search Report dated Feb. 4, 2015 in connection with International Application No. PCT/US2014/059956; 3 pages.

(Continued)

*Primary Examiner* — Christine Skubinna
(74) *Attorney, Agent, or Firm* — Robert C. Klinger

(57) ABSTRACT

A water control system including a showerhead and a tub faucet. The faucet has a temperature controlled valve configured in a first mode to automatically restrict fluid flow through the faucet and direct fluid to the showerhead once the fluid flowing through the faucet reaches a predetermined temperature, referred to as a hot mode. The faucet also has a manual override member configured to manually restrict fluid flow through the faucet and to the showerhead to allow cold showers, referred to as a cold mode. The valve includes a piston, and a sleeve configured to establish the hot mode and the cold mode.

20 Claims, 9 Drawing Sheets

(56) References Cited

U.S. PATENT DOCUMENTS

2009/0308459 A1 12/2009 Gross
2011/0180741 A1* 7/2011 Lockhart ............... E03C 1/0408
251/324

OTHER PUBLICATIONS

Written Opinion of international Searching Authority dated Feb. 4, 2015 in connection with International Application No. PCT/US2014/059956; 11 pages.

* cited by examiner

US 9,737,899 B2

WATER CONTROL SYSTEM HAVING A TEMPERATURE CONTROLLED TUB FAUCET VALVE

CLAIM OF PRIORITY

This application claims priority of U.S. Provisional application Ser. No. 61/888,865 entitled Multifunctional Restrictive Valve System filed Oct. 9, 2013, the teachings of which are incorporated herein in its entirety.

TECHNICAL FIELD

The present invention is generally related to restrictive valves, and more specifically to controlled fluid flow restrictive valves with a temperature controlled cutoff port.

BACKGROUND

It is often necessary, in both consumer and commercial contexts, to wait for a water source to reach a suitable temperature prior to use. For example, it is very common for an individual to turn on the hot water in the shower, or at a sink, and then wait for an extended length of time until the water is at the correct temperature.

Additionally, vast amounts of water and energy are wasted each year due to the delay in receiving water at the correct temperature. That is, as most individuals are reluctant to stand by the shower and/or tub and continuously monitor the water temperature for many minutes, a significant amount of hot water is simply lost down the drain. This increases both water costs as well as heating costs. Multiplied by the number of individuals that must engage in this practice on a daily basis, the water and energy waste is significant.

A flow control valve utilized in a household, such as to provide the delivery of water to a tub and/or showerhead, typically sees a water pressure of at least 100 psi. This high water pressure can affect the operation of the water control valve when it includes moving parts. For instance, the pressure at an upstream port relative to the pressure at a downstream port can negatively affect the performance of the flow control valve. Moreover, this high pressure can require operational portions of the valve to be comprised of more expensive and stronger materials to withstand any pressure differentials between the upstream port, and the downstream port.

In a water system including both a bathing tub and a showerhead, the tub has a faucet that is configured to dispense water at a high rate. Typically, water dispenses through a tub faucet at the high rate, such as 6-10 gallons per minute, as there are no water saving control valves utilized in a tub faucet. When a user wants to take a shower, the user activates a diverter valve to redirect heated water away from the tub faucet and to the shower head. This scenario wastes a tremendous amount of water through the tub faucet, considering that the average user may run water through the tub faucet an average of 45 seconds after the water is warm before manually activating the faucet diverter valve to operate the showerhead.

Moreover, temperature controlled water saving valves are not utilized in tub faucets because many users want to take cold showers and baths.

There is desired a water control system including a tub faucet and showerhead that reduces the amount of water waste through the tub faucet before operating the showerhead, yet which permits a user to override the system.

SUMMARY

A water control system including a showerhead and a tub faucet. The faucet has a temperature controlled valve configured in a first mode to automatically restrict fluid flow through the faucet and direct fluid to the showerhead once the fluid flowing through the faucet reaches a predetermined temperature, referred to as a hot mode. The faucet also has a manual override member configured to manually restrict fluid flow through the faucet and to the showerhead to allow cold showers, referred to as a cold mode. The valve includes a piston, and a sleeve configured to establish the hot mode and the cold mode.

DETAILED DESCRIPTION

In one example embodiment of this disclosure, a water control system includes a showerhead and a tub faucet having a temperature controlled valve. The valve has a hot bypass mode, and a cold bypass mode. In the hot bypass mode, water flows through the valve until its temperature reaches a predetermined temperature, and then the valve closes and operates as a diverter, directing the heated water to the showerhead. In the cold bypass mode, the valve can be manually set to divert water to the showerhead, regardless of temperature, such as to provide a cold shower.

Figure 1:
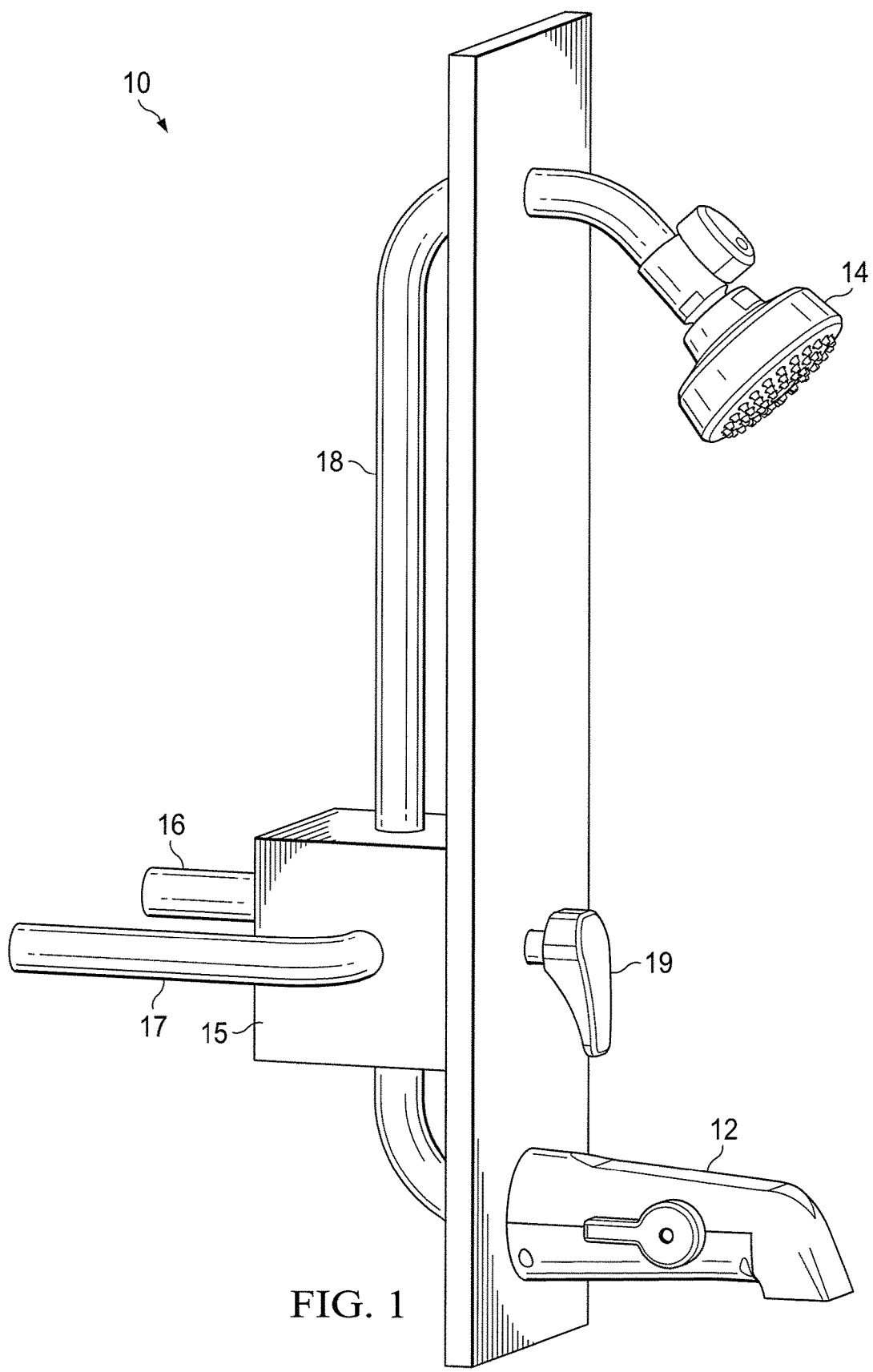
FIG. 1 illustrates a water control system having a showerhead and a tub faucet including a temperature controlled valve assembly according to one example embodiment of the disclosure.

Referring now to FIG. 1 there is shown an example embodiment according to this disclosure depicting a water saving system 10 including a tub faucet 12, a showerhead 14, a water mixing valve 15 configured to receive a cold water from source 16 and hot water from source 17, and plumbing 18 extending between these elements. The mixing valve 15 has a control 19 controllable by a user to establish a desired temperature of water that is provided to the tub faucet 12 and/or showerhead 14 through plumbing 18.

Advantageously, the tub faucet 12 includes a water saving valve 22 positioned in the faucet 12 and is configured to be positioned as a function of the water flowing through the faucet, and also has a manually settable override member 24. The valve 22 is configured to restrict the flow of water through the faucet 12 when water flowing through the faucet reaches and exceeds a temperate threshold. In addition, when the valve 22 is closed, the water flow is automatically directed from the faucet 12 to the showerhead 14. Thus, the valve 22 operates as both a temperature controlled valve and also as a tub spout diverter valve. The valve 22 also includes a manually operable override member 24 configured to disable the valve 22 such that water of any temperature can flow through and exit the valve 22.

Figure 2:
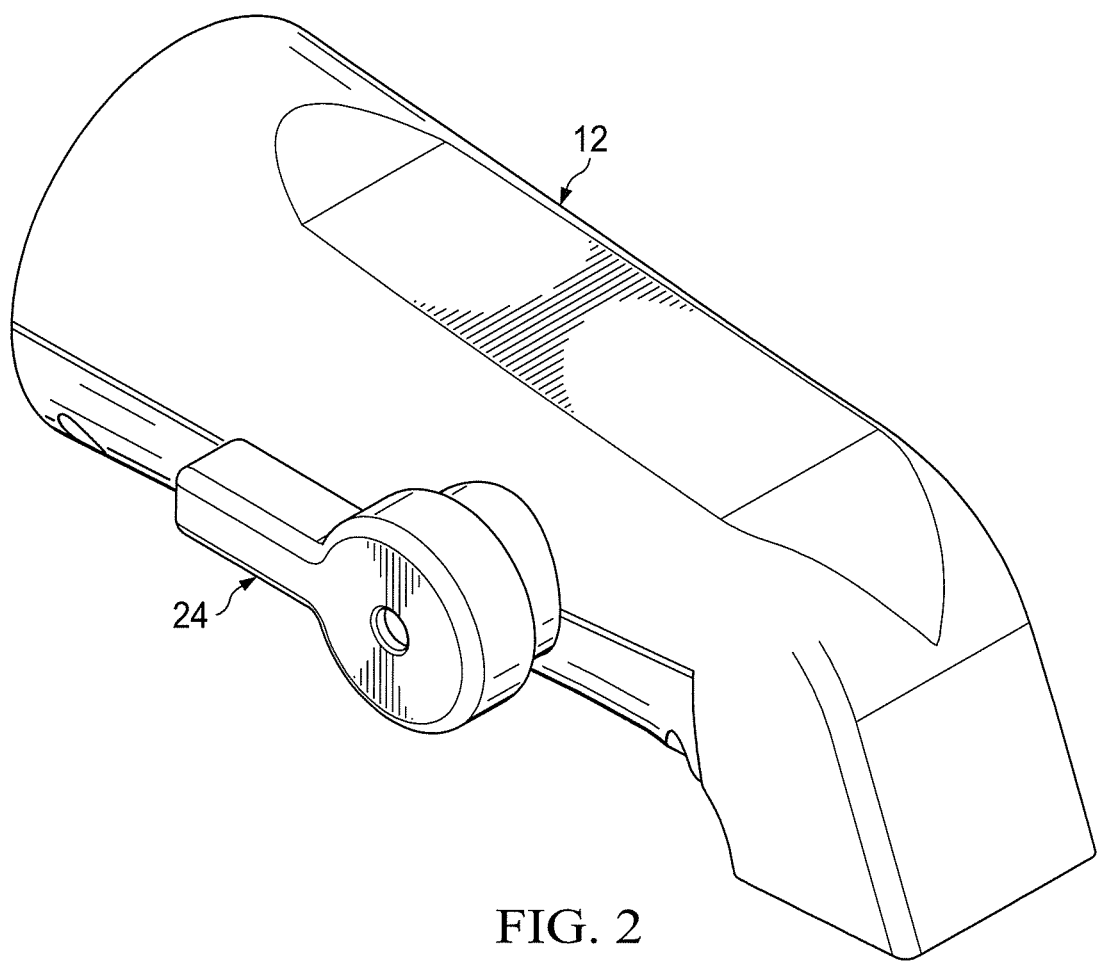
FIG. 2 illustrates a perspective view of the tub faucet having a manual override control.

Referring to FIG. 2, faucet 12 is shown according to one example embodiment of this disclosure.

Figure 3:
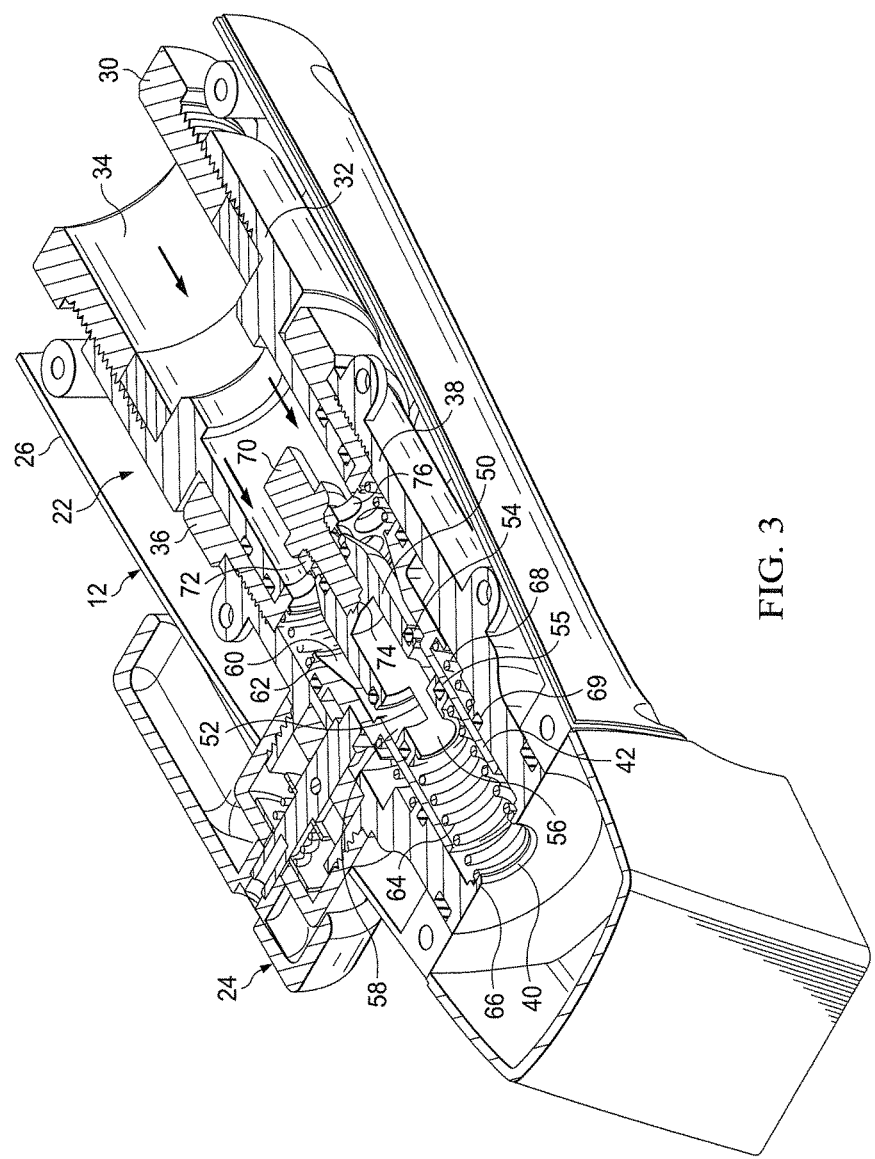
FIG. 3 illustrates a cross section of the faucet temperature controlled valve with the piston in the non-extended position such that water freely flows through the valve and the faucet.

Referring to FIG. 3, cross sectional view of faucet 12 is shown having a valve 22 positioned therein. The valve 22 is shown in a first position allowing water to freely pass through the faucet 12. Valve 22 is secured in a tubular faucet body 26. Valve 22 comprises of an annular body front 30 threadably received into a proximal end of an annular main body 32 secured to faucet body 26. An upstream port 34 is defined at a proximal opening of body front 30. An annular middle body 36 has a proximal end annularly disposed about a distal end of main body 32, and has a distal end threadably received in an annular end body 38. A distal end of end body 38 has a downstream port 40 positioned at the outlet of faucet body 26. An axially slidable sleeve 42 is axially positioned in the end body 38.

A slidable piston 50 is axially and slidably disposed in the sleeve 42. Piston 50 has a recessed middle portion 52 defined between a proximal O-ring 54 and a distal O-ring 55, the recessed piston middle portion 52 forming an annular fluid passageway 56 extending between the piston middle portion 52 and an opposing inner wall 58 of sleeve 42, as shown. When fluid is permitted to flow through valve 22, a fluid path 60 extends from passageway 56 to an outwardly tapered proximal end 62 of sleeve 42. An O ring 64 is provided in an annular outer recess at the proximal end 62 providing a fluid seal between the sleeve 42 and the end body 38.

A spring 64 is annularly positioned in the distal end of end body 38 and in the distal end of the piston 50. The spring 64 is compressed, and is engaged against an inner flange 66 at the distal end of end body 38 and a distal end of the piston 50. The spring 64 is configured to bias the piston 50 proximally and away from the flange 66. A spring 68 is annularly positioned in the distal end of end body 38 that encompasses the sleeve 42 and extends between an end flange of end body 38 and a flange of sleeve 42. Spring 68 is configured to bias the sleeve 42 proximally. Seal 69 seals the sleeve 42 with respect to the end body 38.

Figure 4:
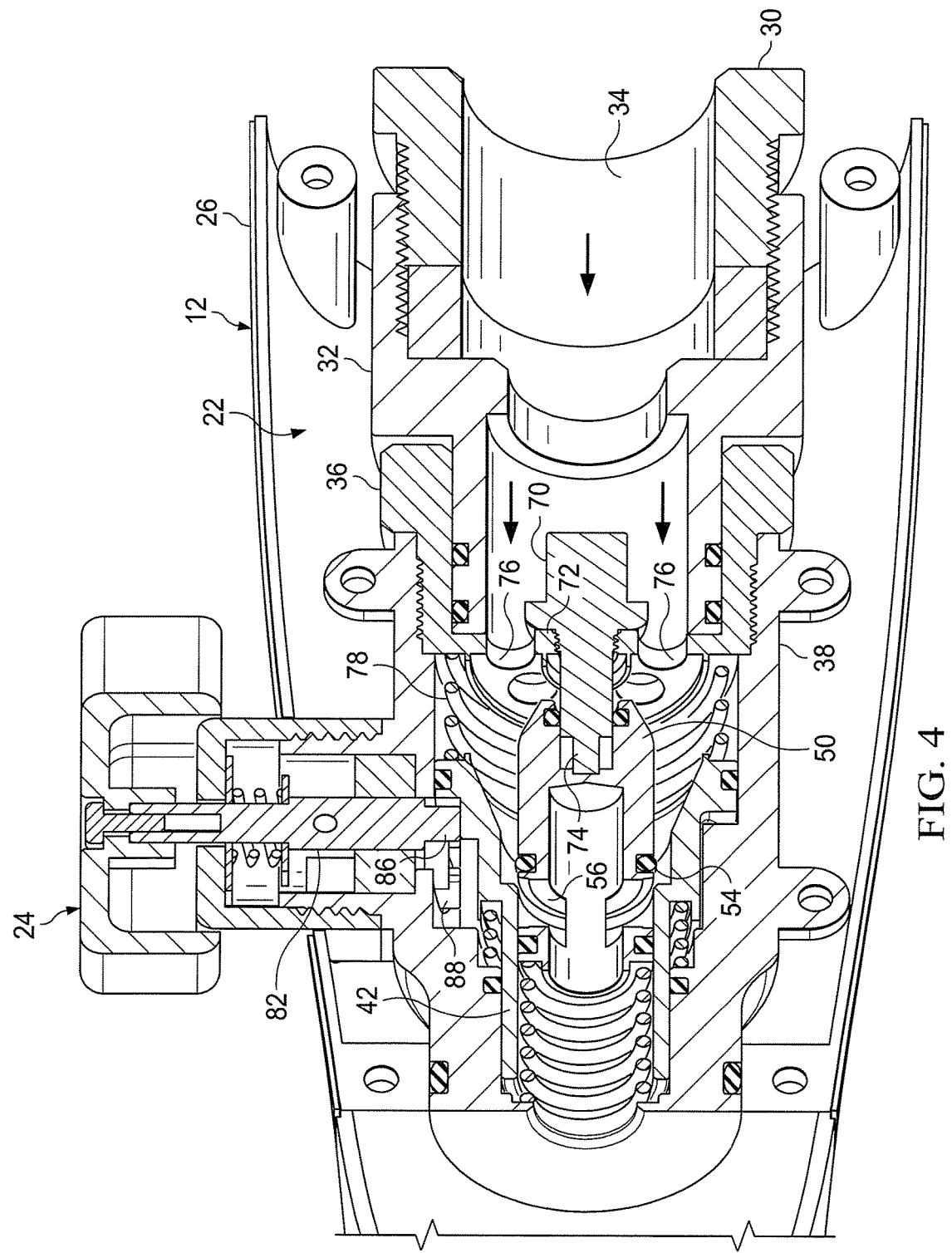
FIG. 4 illustrates a cross section of the faucet temperature controlled valve in the hot bypass mode with the piston in the extended position such that water is automatically restricted from flowing through the faucet when the water reaches a threshold temperature, and also the water automatically directed from the faucet to the showerhead.

The temperature sensitive actuator 70 is axially and threadably received in an annular flange 72 defined at the distal end of middle body 36. The actuator 70 may be a paraffin wax actuator. The actuator 70 has an actuator nose 74 that axially extends and pushes a proximal end of piston 50 when the temperature of water passing about the outer surface of actuator 70, and through openings 76 defined each side of annular flange 72, reaches and exceeds a predetermined temperature. As shown in FIG. 4, the extension of the actuator nose 74 axially pushes the piston 50 distally such that proximal seal 54 of piston 50 extends into the sleeve 42 and closes the passageway 56, thus preventing the flow of water through sleeve 42 and the valve 22. Therefore, the closed valve 22 functions as an automatic diverter, and warmed fluid flow is automatically directed from the faucet 12 to the showerhead 14.

Figure 5:
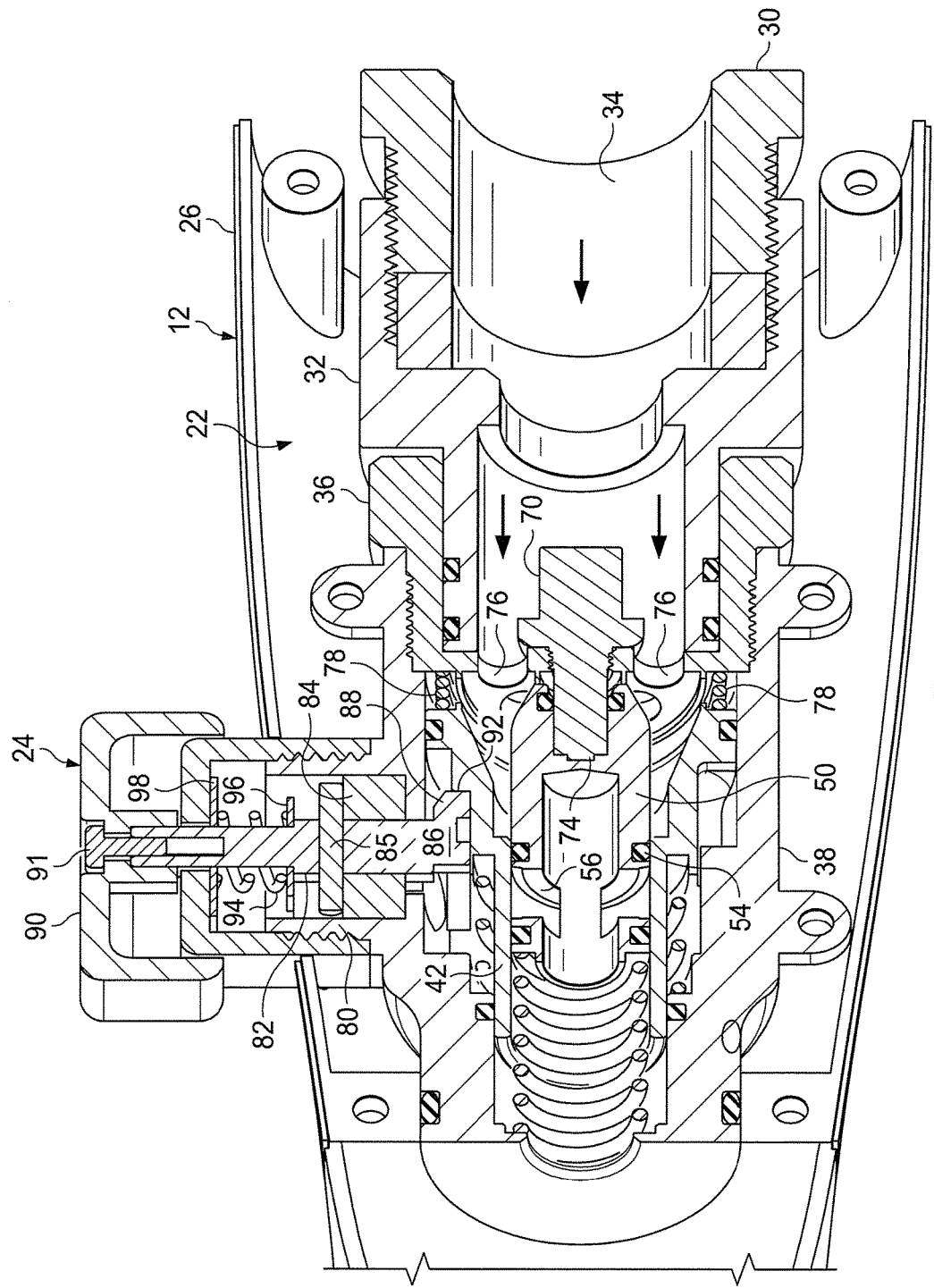
FIG. 5 illustrates a cross section of the faucet including a manual override member configured to disengage the temperature control valve in the cold bypass mode.

An actuator spring 78 is a secondary spring positioned in the end body 38, and is in the compressive state. Spring 78 is configured to counteract the sleeve 42 when manually put in manual cold bypass mode (FIG. 5) to help the valve 22 reset each time to its original position in the hot bypass mode (FIG. 3 and FIG. 4). The spring 78 engages the proximal end of sleeve 42 and extends to and against the distal end of middle body 36. The spring 78 distally biases the sleeve 42 into the end body 38 as shown in FIG. 3 and FIG. 4, but also permits the sleeve 42 to move proximal as shown in FIG. 5 when urged by the override member 24 to manually close the passageway 56 and prevent flow of fluid through valve 22, regardless of the temperature of the fluid proximate the actuator 70. Thus, water flow is manually directed from faucet 12 to the showerhead 14 at a temperature established by the mixer 16.

Figure 6:
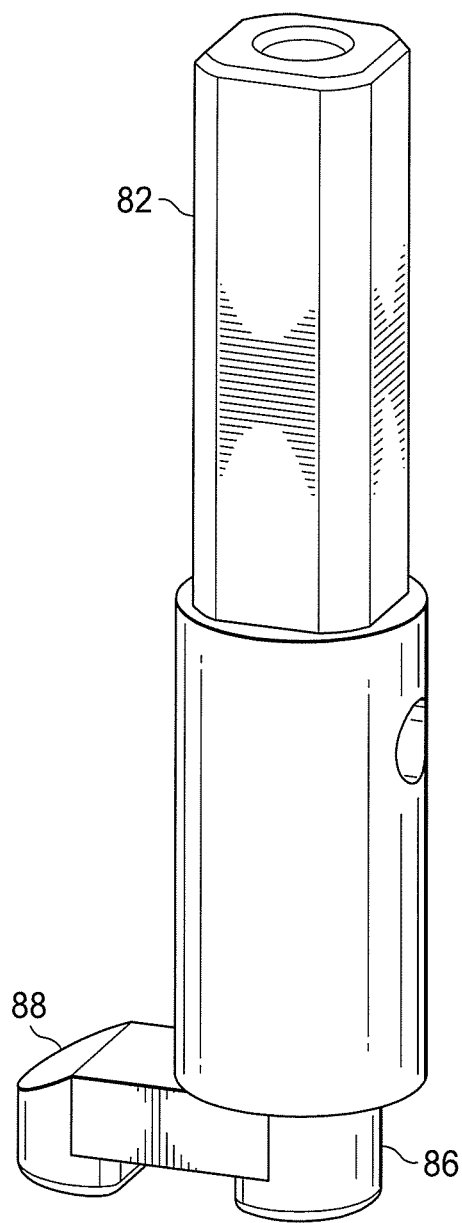
FIG. 6 illustrates a perspective view of the handle and cam.

Referring to FIG. 5, the valve 22 is shown in the cold bypass mode. End body 38 includes a threaded annular extension 80. Extension 80 is configured to receive a radially extending pin 82 extending through a collar 84 having 2 opposing tapered upper surfaces 83, forming a cam. A lever 85 extends radially from a midsection of pin 82 each side of pin 82, and rides upon the respective upper surface of the collar 84 causing the pin 82 to retract away from valve 22 when rotated counterclockwise. The pin 82 is further shown in FIG. 6. The pin 82 has a distal tip portion 86, and has a radially extending cam 88 configured to selectively engage a flanged surface 92 of sleeve 42. A handle 90 is secured to the outer end of pin 82 by a fastener 91. A spring 94 is defined between an annular pin flange 96 and an inner surface of a cap 98. The cap 98 is threadably connected to the extension 80. The spring 94 is configured to assist in returning the handle 24 to the hot bypass mode position when rotated clockwise.

Figure 7:
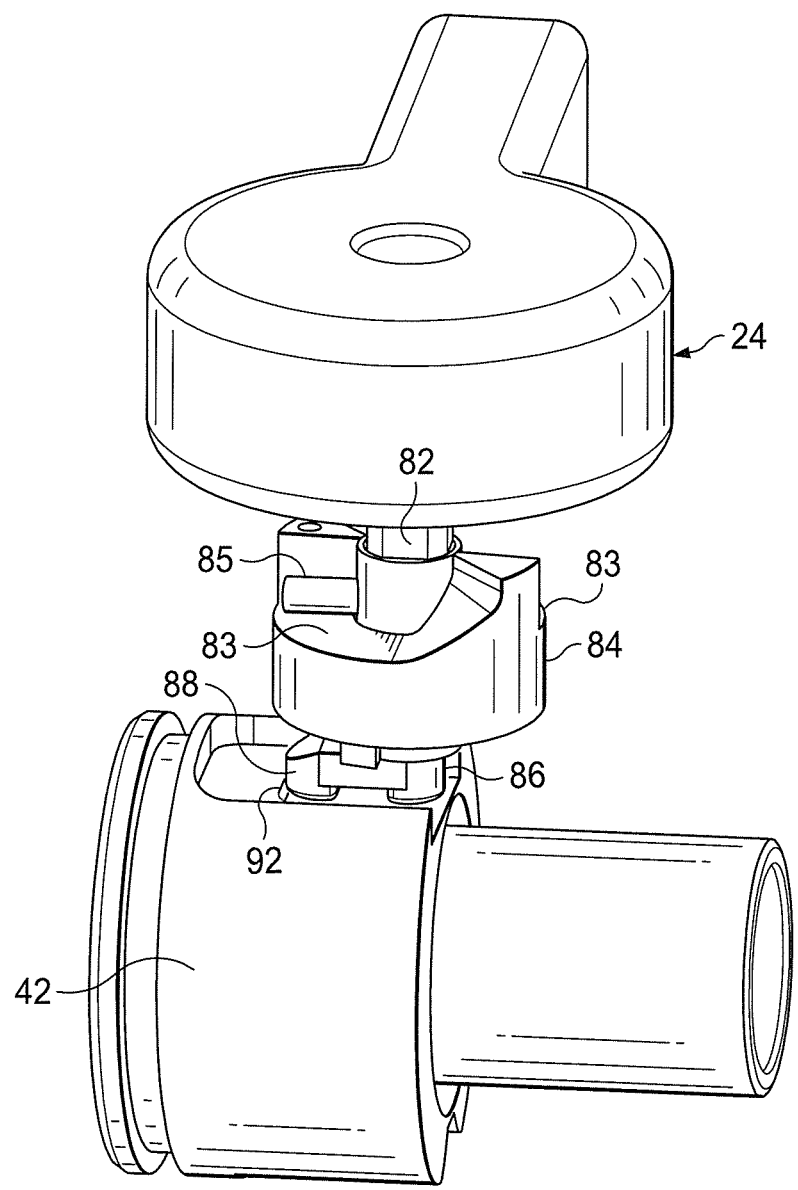
FIG. 7 illustrates the handle and the cam when the valve is in the hot bypass mode.
Figure 8:
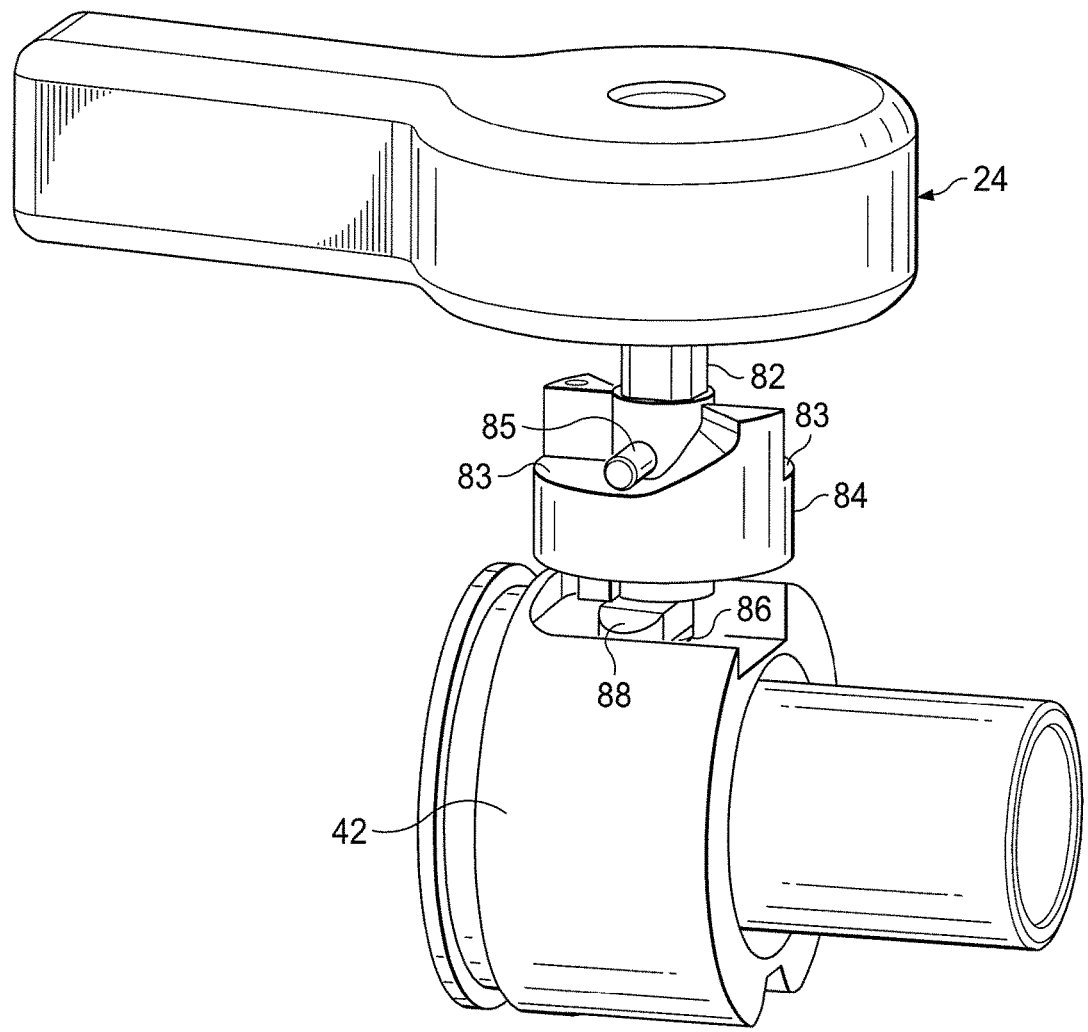
FIG. 8 illustrates the handle and the cam when the valve is partially rotated, between the hot bypass mode and the cold bypass mode.
Figure 9:
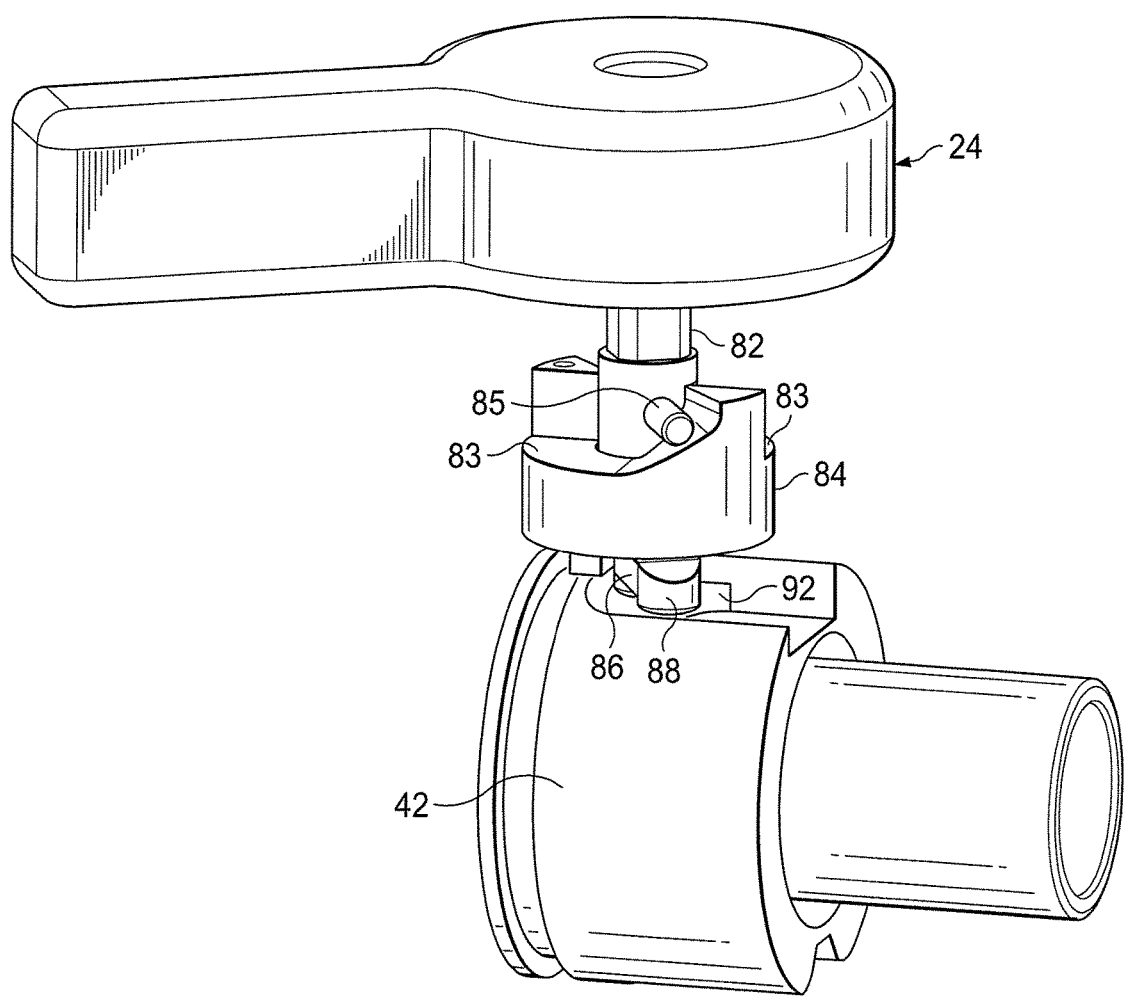
FIG. 9 illustrates the handle and the cam when the valve is completely rotated counterclockwise and the valve is in the cold bypass mode.

FIG. 7 shows the cam 88 position in the hot bypass mode, corresponding to FIG. 4. Upon rotation of the handle 90 and the cam 88 in the clockwise direction and laterally engages a flange 92 annularly defined about the proximal end of sleeve 42 as shown in FIG. 8. As the handle 90 and cam 88 continue to rotate the cam 88 pushes the sleeve 42 proximally, as shown in FIG. 9, such that piston 50 extends distally into sleeve 42 and closes passageway 56, and thus restricts fluid flow in the valve 22 in the cold bypass mode. The pin 85 riding along the upper surface of collar 84 helps reduce friction between cam 88 and the surface of sleeve 42 during rotation. In the cold bypass mode, cold water is thus directed to showerhead 14 to provide a cold shower.

When the handle 90 is rotated counter-clockwise, from the position shown in FIG. 9 to the position shown in FIG. 7, the cam 88 retracts from flange 92 and the spring 78 pushes the sleeve 42 back into the hot bypass mode such as shown in FIG. 3 and FIG. 4, such that the piston 50 can move in response to the extended actuator nose 74.

Advantageously, the valve 22 can operate to automatically deflect hot water to the showerhead 14, referred to as the hot mode, or can be manually set to manually directed cold water to the showerhead 14, referred to as the cold mode. In both modes, a significant water savings is obtained by preventing an excess amount of water being dispensed through the tub faucet to establish the shower mode with either hot or cold water.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A fluid control system, comprising:
a showerhead;
plumbing configured to couple fluid to the showerhead; and
a tub faucet coupled to the plumbing and configured to dispense a fluid, the tub faucet including a valve configured to control flow of the fluid through the tub faucet, the valve comprising:
a main body having only a single flow channel, the single flow channel extending between an inlet port and an outlet port, wherein the inlet port is configured to be coupled to a fluid source and the outlet port is configured to dispense fluid into a bathing tub;
a temperature sensitive actuator positioned in the single flow channel of the main body; and
a piston positioned in the main body, the piston configurable in a first position whereby the fluid is permitted to flow through the single flow channel of the faucet, and a second position established by the temperature sensitive actuator having a threshold such that the fluid is restricted from flowing through the single flow channel of the valve when the fluid reaches the threshold, wherein the valve is operable in a first mode such that the fluid is automatically prevented from flowing through the single flow channel of the valve and is automatically directed to the showerhead when the fluid reaches the threshold; and
the valve is operable in a second mode, wherein the valve has a manually settable override member configured to prevent fluid flow through the single flow channel of the tub faucet from the inlet port to the outlet port of the tub faucet regardless of the temperature of the fluid.

2. The system as specified in claim 1 wherein the single flow channel extends from the inlet port and along the piston without causing the fluid to impinge on a surface perpendicular to fluid flow to reduce turbulence of fluid flow through the single flow channel.

3. The system as specified in claim 1 further comprising a sleeve positioned in the main body, wherein the override member is configured to position the sleeve in a first position when the valve is in the first mode, and position the sleeve in a second position when the valve is in the second mode.

4. The system as specified in claim 3 wherein the override member has a cam configured to position the sleeve.

5. The system as specified in claim 3 wherein the piston is positioned in the sleeve, and the piston is selectively configurable to engage, the sleeve to allow or prevent fluid flow through the sleeve as a function of the sleeve position.

6. The system as specified in claim 3 further comprising a spring biasing the sleeve toward the first position.

7. The system as specified in claim 1 wherein a passageway is selectively established between the piston and the sleeve as a function of a sleeve position.

8. The system as specified in claim 1 further comprising a mixer valve configured to provide fluid to the faucet at a user selectable temperature.

9. The system specified in claim 1 wherein the temperature sensitive actuator comprises paraffin wax, configured such that the temperature sensitive actuator is configured to urge the piston when heated.

10. The system as specified in claim 1 wherein the temperature sensitive actuator is disposed proximal of the piston.

11. A tub faucet configured to dispense a fluid, the tub faucet including a valve configured to control a flow of fluid through the tub faucet, the valve comprising:
a main body having only a single flow channel, the single flow channel extending between an inlet port and an outlet port, wherein the inlet port is configured to be coupled to a fluid source and the outlet port is configured to dispense fluid into a bathing tub;
a temperature sensitive actuator positioned in the single flow channel of the main body; and
a piston positioned in the main body, the piston configurable in a first position whereby the fluid is permitted to flow through the single flow channel of the faucet, and a second position established by the temperature sensitive actuator having a threshold such that the fluid is restricted from flowing through the single flow channel of the valve when the fluid reaches the threshold, wherein:
the valve is operable in a first mode such that the fluid is automatically prevented from flowing through the single flow channel of the valve when the fluid reaches the threshold, and
the valve is operable in a second mode, wherein the valve has a manually settable override member configured to prevent fluid flow through the single flow channel of the tub faucet from the inlet port to the outlet port of the tub faucet regardless of, the temperature of the fluid.

12. The faucet, as specified in claim 11 further comprising a sleeve positioned in the main body, wherein the override member is configured to position the sleeve in a first sleeve position when the valve is in the first mode, and position, the sleeve in a second sleeve position when the valve is in the second mode.

13. The faucet as specified in claim 12 wherein the override member has a cam configured to position the sleeve.

14. The faucet as specified, in claim 12 wherein the piston is positioned in the sleeve, and the piston is selectively configurable to engage the sleeve to allow or prevent fluid flow through the sleeve as a function of the sleeve position.

15. The faucet as specified in claim 12 further comprising a first spring biasing the sleeve toward the first sleeve position.

16. The faucet as specified in claim 12 wherein a passageway is selectively established between the piston and the sleeve as a function of the sleeve position.

17. The faucet as specified in claim 11 wherein the temperature sensitive actuator comprises paraffin wax, configured such that the temperature sensitive actuator is configured to urge the piston when heated.

18. The faucet as specified in claim 11 wherein the single flow channel extends from the inlet port and along the piston without causing the fluid to impinge on a surface perpendicular to fluid flow to reduce turbulence of fluid flow through the single flow channel.

19. The faucet as specified in claim 15 further comprising a second spring biasing the sleeve toward the second sleeve position and counteracting the first spring.

20. The faucet as specified in claim 12 further comprising a handle having a cam configured to position the sleeve in the first sleeve position and the second sleeve position.

* * * * *